(12) United States Patent
Reid et al.

(10) Patent No.: US 11,768,219 B2
(45) Date of Patent: *Sep. 26, 2023

(54) ANGLE OF ATTACK SENSOR WITH THERMAL ENHANCEMENT

(71) Applicant: Rosemount Aerospace Inc., Burnsville, MN (US)

(72) Inventors: Alexander N. Reid, St. Louis Park, MN (US); Richard Alan Schwartz, Faribault, MN (US); William B. Krueger, Bloomington, MN (US); Timothy DeAngelo, Edina, MN (US); Kenneth Freeman, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,382

(22) Filed: Oct. 20, 2021

(65) Prior Publication Data

US 2022/0043022 A1 Feb. 10, 2022

Related U.S. Application Data

(63) Continuation of application No. 15/824,589, filed on Nov. 28, 2017, now Pat. No. 11,181,545, which is a
(Continued)

(51) Int. Cl.
*G01P 13/02* (2006.01)
*B64D 43/00* (2006.01)
(Continued)

(52) U.S. Cl.
CPC ............ *G01P 13/025* (2013.01); *B64D 43/00* (2013.01); *B64D 45/0005* (2013.01); *B64D 15/14* (2013.01)

(58) Field of Classification Search
CPC ... G01P 13/025; B64D 43/00; B64D 45/0005; B64D 15/14
(Continued)

(56) References Cited

U.S. PATENT DOCUMENTS 3,082,622 A 3/1963 Andrew
3,208,277 A 9/1965 Hays, Jr.
(Continued)

FOREIGN PATENT DOCUMENTS

CA 2717927 A1 4/2011
CA 2745138 A1 1/2012
(Continued)

OTHER PUBLICATIONS

Extended European Search Report for European Patent Application No. 21209813.1, dated Mar. 29, 2022, 6 pages.
(Continued)

*Primary Examiner* — Marrit Eyassu
(74) *Attorney, Agent, or Firm* — Kinney & Lange, P.A.

(57) ABSTRACT

An angle of attack sensor includes a vane assembly and a multi-piece faceplate adjacent the vane assembly. The faceplate includes a heated chassis defining a pocket and a mounting plate positioned adjacent the heated chassis and having an opening. The vane assembly has a portion that is positioned in the pocket of the heated chassis and extends through the opening of the mounting plate.

20 Claims, 5 Drawing Sheets

Related U.S. Application Data continuation-in-part of application No. 15/720,701, filed on Sep. 29, 2017, now Pat. No. 10,730,637, and a continuation-in-part of application No. 15/679,824, filed on Aug. 17, 2017, now Pat. No. 10,393,766.

(51) Int. Cl.
   *B64D 45/00* (2006.01)
   *B64D 15/14* (2006.01)

(58) Field of Classification Search
   USPC ............................................. 73/170.01
   See application file for complete search history.

(56) References Cited

U.S. PATENT DOCUMENTS

| | | | |
|---|---|---|---|
| 3,400,582 A | 9/1968 | Warner | |
| 3,514,997 A | 6/1970 | Gwathmey et al. | |
| 3,534,600 A | 10/1970 | Eichweber et al. | |
| 3,604,259 A | 9/1971 | Heinsohn et al. | |
| 3,665,760 A | 5/1972 | Pitches et al. | |
| 3,882,721 A | 5/1975 | Neary et al. | |
| 4,230,290 A | 10/1980 | Townsend et al. | |
| 4,390,950 A | 6/1983 | Muller | |
| 4,458,137 A | 7/1984 | Kirkpatrick | |
| 4,468,961 A | 9/1984 | Berg | |
| 4,830,164 A | 5/1989 | Hays | |
| 4,901,566 A | 2/1990 | Boetsch et al. | |
| 5,025,661 A | 6/1991 | Mccormack | |
| 5,062,869 A * | 11/1991 | Hagen ................ | G01P 5/165 96/420 |
| 5,115,237 A | 5/1992 | Greene | |
| 5,322,246 A | 6/1994 | Henne et al. | |
| 5,438,865 A * | 8/1995 | Greene ............... | G01P 13/025 73/180 |
| 5,442,958 A | 8/1995 | Hagen | |
| 5,466,067 A | 11/1995 | Hagen et al. | |
| 5,628,565 A | 5/1997 | Hagen et al. | |
| 6,070,475 A | 6/2000 | Muehlhauser et al. | |
| 6,076,963 A | 6/2000 | Menzies et al. | |
| 6,510,740 B1 | 1/2003 | Behm et al. | |
| 6,561,006 B1 | 5/2003 | Roberge et al. | |
| 6,672,152 B2 | 1/2004 | Rouse et al. | |
| 6,813,942 B1 * | 11/2004 | Vozhdaev ........... | G01P 5/165 73/170.02 |
| 6,845,658 B2 | 1/2005 | Roberge et al. | |
| 6,918,294 B1 | 7/2005 | Roberge | |
| 6,941,805 B2 | 9/2005 | Seidel et al. | |
| 7,186,951 B2 | 3/2007 | Zippold et al. | |
| 7,401,507 B2 | 7/2008 | Collot et al. | |
| 7,597,018 B2 | 10/2009 | Braun et al. | |
| 7,748,268 B2 | 7/2010 | Lull et al. | |
| 8,397,565 B1 | 3/2013 | Dillon et al. | |
| 9,752,945 B2 | 9/2017 | Hedtke et al. | |
| 10,179,654 B2 | 1/2019 | Anderson et al. | |
| 10,197,588 B2 | 2/2019 | Wong et al. | |
| 10,393,766 B2 | 8/2019 | Alcaya et al. | |
| 2003/0115948 A1 | 6/2003 | Rouse et al. | |
| 2004/0188945 A1 | 9/2004 | Poincet et al. | |
| 2004/0261518 A1 | 12/2004 | Seidel et al. | |
| 2010/0116806 A1 | 5/2010 | Hollingsworth et al. | |
| 2011/0208375 A1 | 8/2011 | Spoerry et al. | |
| 2015/0082878 A1 | 3/2015 | Bigand | |
| 2015/0110149 A1 | 4/2015 | Bgin-Drolet et al. | |
| 2015/0122797 A1 | 5/2015 | Eggers | |
| 2015/0344137 A1 * | 12/2015 | Bartz ................. | G01P 13/025 219/494 |
| 2016/0033356 A1 | 2/2016 | Deangelo et al. | |
| 2016/0114883 A1 | 4/2016 | Guerry et al. | |
| 2016/0356175 A1 | 12/2016 | Waddington | |
| 2017/0199218 A1 | 7/2017 | Benning | |
| 2017/0273144 A1 | 9/2017 | Caillot et al. | |
| 2018/0079525 A1 | 3/2018 | Krueger et al. | |
| 2018/0136249 A1 | 5/2018 | Krueger et al. | |
| 2019/0056425 A1 | 2/2019 | Reid et al. | |
| 2019/0100327 A1 | 4/2019 | Krueger et al. | |
| 2019/0210734 A1 | 7/2019 | Whalen | |
| 2019/0242924 A1 | 8/2019 | Lang et al. | |
| 2019/0301949 A1 | 10/2019 | Gordon et al. | |
| 2019/0346478 A1 | 11/2019 | Reid et al. | |
| 2019/0346479 A1 | 11/2019 | Reid | |
| 2020/0309630 A1 | 10/2020 | Gilkison et al. | |

FOREIGN PATENT DOCUMENTS

| | | |
|---|---|---|
| CN | 103410682 A | 11/2013 |
| CN | 104034301 A | 9/2014 |
| CN | 105142246 A | 12/2015 |
| CN | 106628206 A | 5/2017 |
| CN | 107687350 A | 2/2018 |
| CN | 107843249 A | 3/2018 |
| DE | 102008007469 A1 | 8/2009 |
| DE | 202014105763 U1 | 2/2016 |
| EP | 212167 A2 | 3/1987 |
| EP | 212167 A3 | 11/1987 |
| EP | 1319863 A1 | 6/2003 |
| EP | 932831 B1 | 2/2004 |
| EP | 1844863 A1 | 10/2007 |
| EP | 1980860 A2 | 10/2008 |
| EP | 2950106 A1 | 12/2015 |
| EP | 2980589 A1 | 2/2016 |
| EP | 3012187 A1 | 4/2016 |
| EP | 3056884 A1 | 8/2016 |
| EP | 3413025 A1 | 12/2018 |
| EP | 3567375 A1 | 11/2019 |
| EP | 3567376 A1 | 11/2019 |
| GB | 2039676 A | 8/1980 |
| SE | 1751245 A1 | 4/2019 |
| SE | 541696 C2 | 11/2019 |
| WO | 9010492 A1 | 9/1990 |
| WO | 03027654 A2 | 4/2003 |
| WO | 03087847 A1 | 10/2003 |
| WO | 2006121321 A1 | 11/2006 |

OTHER PUBLICATIONS

Extended European Search Report for European Patent Application No. 20159881.0, dated Jun. 15, 2020, 5 pages.
Extended European Search Report for European Patent Application No. 18189469.2, dated Jan. 21, 2019, 7 pages.
Extended European Search Report for European Patent Application No. 18189480.9, dated Mar. 6, 2019, 10 pages.
Extended European Search Report for European Patent Application No. 18189477.5, dated Jan. 21, 2019, 10 pages.
Extended European Search Report for European Patent Application No. 19213954.1, dated Jul. 10, 2020, 9 pages.
Extended European Search Report for European Patent Application No. 18215700.8, dated May 20, 2019, 9 pages.
Extended European Search Report for European Patent Application No. 19173361.7, dated Sep. 11, 2019, 11 pages.
Extended European Search Report for European Patent Application No. 19173355.9, dated Sep. 11, 2019, 12 pages.
Extended European Search Report for European Patent Application No. 19216057.0, dated Jul. 8, 2020, 10 pages.
Extended European Search Report for European Patent Application No. 20213883.0, dated Apr. 23, 2021, 9 pages.
Communication Pursuant to Article 94(3) EPC for European Patent Application No. 18215700.8, dated Jul. 8, 2020, 4 pages.
Communication Pursuant to Article 94(3) EPC for European Patent Application No. 18189480.9, dated Nov. 11, 2019, 4 pages.

* cited by examiner

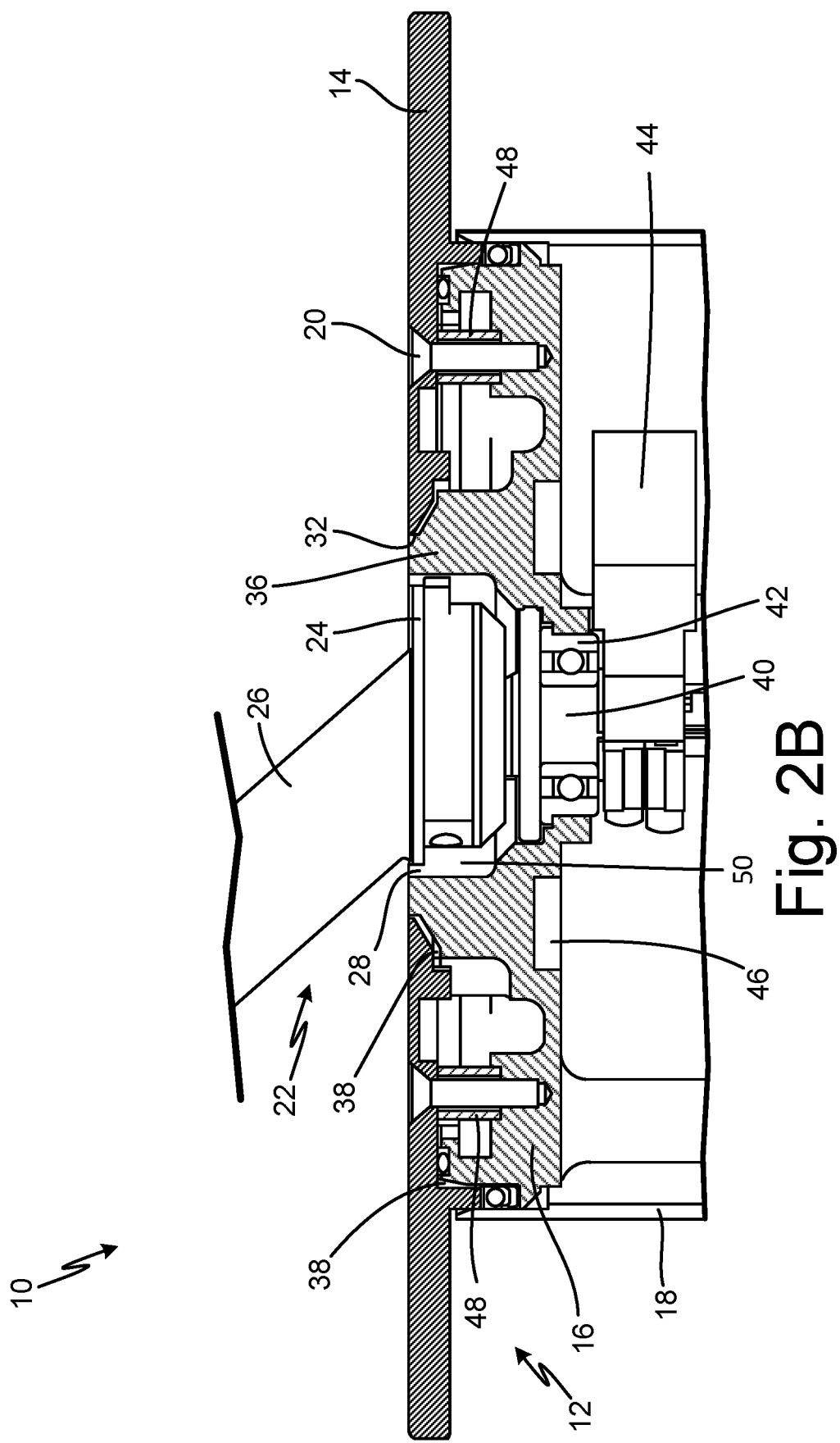

ANGLE OF ATTACK SENSOR WITH THERMAL ENHANCEMENT

CROSS-REFERENCE TO RELATED APPLICATION(S)

This application is a continuation of U.S. application Ser. No. 15/824,589 filed Nov. 28, 2017, entitled "ANGLE OF ATTACK SENSOR WITH THERMAL ENHANCEMENT," which is a continuation-in-part of U.S. application Ser. No. 15/720,701 filed Sep. 29, 2017, entitled "INTEGRAL VANE BASE ANGLE OF ATTACK SENSOR," and U.S. application Ser. No. 15/679,824 filed Aug. 17, 2017, entitled "WATER MANAGEMENT SYSTEM FOR ANGLE OF ATTACK SENSORS," which are incorporated by reference in their entireties.

BACKGROUND

The present disclosure relates to sensors, and in particular, to angle of attack sensors.

Angle of attack sensors with rotatable vanes are installed on sides of aircraft to measure the aircraft angle of attack, the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack.

When an aircraft is in flight, the oncoming airflow is cold and moist. Cold and moist airflow can result in ice accretion on the vane of an angle of attack sensor. Ice accretion can impede or interfere with the free rotation and aerodynamic characteristics of the vane, which can cause the angle of attack sensor to generate less accurate measurements.

SUMMARY

An angle of attack sensor includes a vane assembly and a multi-piece faceplate adjacent the vane assembly. The faceplate includes a heated chassis defining a pocket and a mounting plate positioned adjacent the heated chassis and having an opening. The vane assembly has a portion that is positioned in the pocket of the heated chassis and extends through the opening of the mounting plate.

BRIEF DESCRIPTION OF THE DRAWINGS

FIG. 2B is an enlarged partial cross-sectional side view of the angle of attack sensor.

DETAILED DESCRIPTION

In general, the present disclosure describes an angle of attack (AOA) sensor having a multi-piece faceplate including an outer faceplate, or mounting plate, and an inner faceplate, or heated chassis, which are thermally isolated for improving thermal management by controlling conductive and convective heat flow. Further, a standoff made of material having a thermal conductivity lower than the heated chassis may be positioned between the mounting plate and the heated chassis to choke the heat flow. As a result, heat flow is directed to the rotatable components to prevent ice accretion that impedes vane rotation, avoiding faulty AOA readings.

Figure 1:
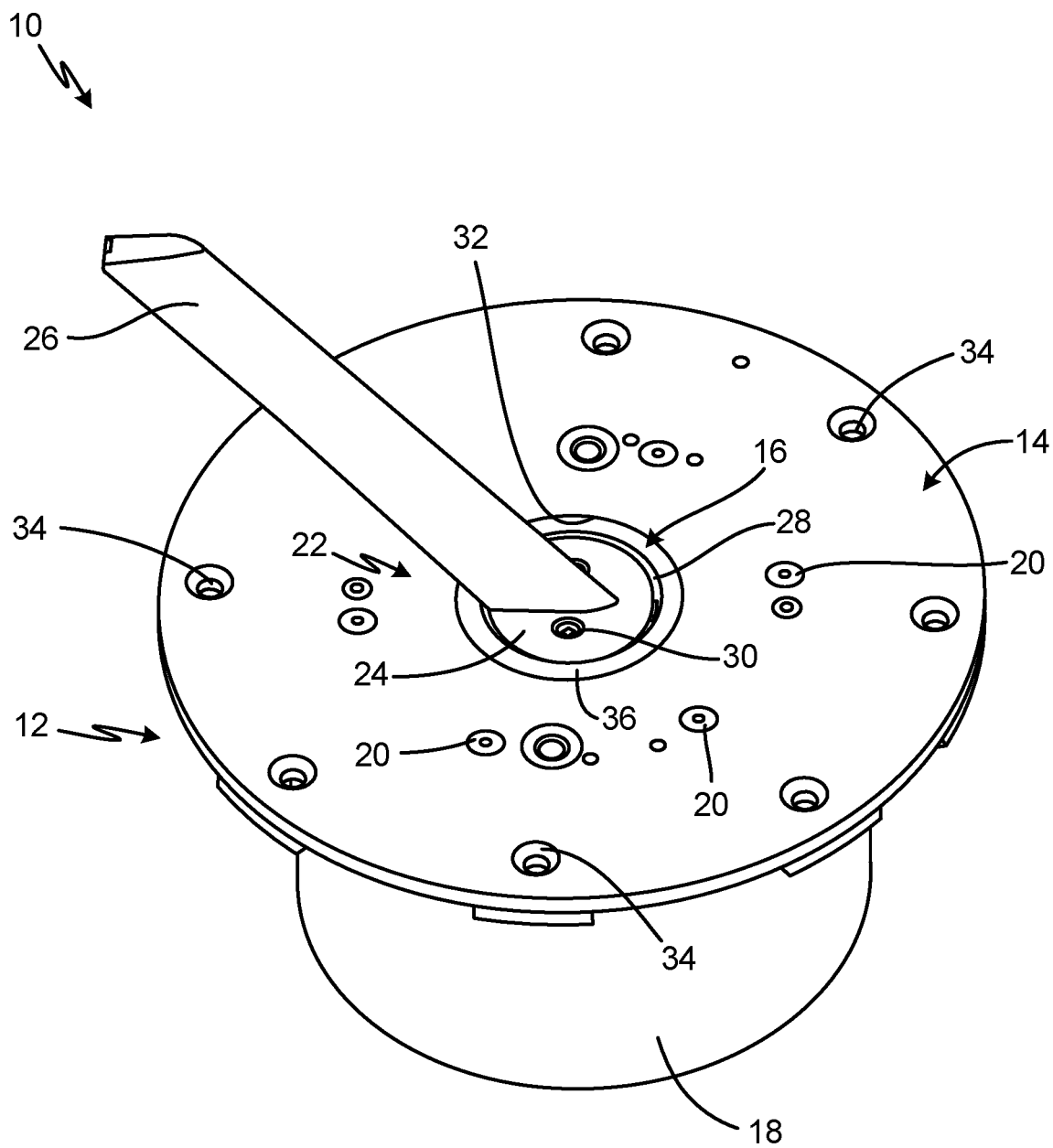
FIG. 1 is a perspective top view of an angle of attack sensor.

FIG. 1 is a perspective top view of angle of attack sensor 10. Angle of attack sensor 10 includes faceplate 12 (which includes mounting plate 14 and heated chassis 16), housing 18, fasteners 20, vane assembly 22 (which includes vane base 24 and vane 26), annular gap 28, and shaft connectors 30. Mounting plate 14 includes opening 32 and mounting holes 34. Heated chassis 16 includes ring portion 36.

Faceplate 12 is a multi-piece faceplate that includes mounting plate 14, or outer faceplate, and heated chassis 16, or inner faceplate. Mounting plate 14 is adjacent to the heated chassis 16. Mounting plate 14 is positioned on heated chassis 16 such that heated chassis 16 is located inward from or interior to mounting plate 14 with respect to housing 18. Housing 18 is cylindrical with an annular sidewall between an open first end and a closed second end. Faceplate 12 is positioned on housing 18 adjacent the open first end of housing 18. More specifically, heated chassis 16 is positioned within and connected to the open first end of housing 18 such that heated chassis 16 seals the open first end of housing 18. Mounting plate 14 is positioned on heated chassis 16 such that mounting plate 14 is adjacent the open first end of housing 18 and is outward from or exterior to heated chassis 16. As such, mounting plate 14 is an outer piece of faceplate 12 and heated chassis 16 is an inner piece of faceplate 12.

Fasteners 20 are connected to mounting plate 14 and heated chassis 16. Fasteners 20 are positioned around mounting plate 14 and extend through mounting plate 14 into heated chassis 16. In alternate embodiments, fasteners 20 may extend through heated chassis 16 into a portion of mounting plate 14. In such an embodiment, fasteners 20 do not extend all of the way through mounting plate 14 to an exterior surface of mounting plate 14, and thus are not visible from a top view of angle of attack sensor 10. In further alternate embodiments, fasteners 20 may extend into a portion of mounting plate 14 and a portion of heated chassis 16 such that fasteners 20 do not extend all of the way through mounting plate 14 or all of the way through heated chassis 16. In this embodiment, six fasteners 20 extend through mounting plate 14 into heated chassis 16. In alternate embodiments, any number of fasteners 20 may be connected to mounting plate 14 and heated chassis 16. Fasteners 20 may be screws, brackets, or any other suitable fastener.

Vane assembly 22, which includes vane base 24 and vane 26, has a portion that is positioned in heated chassis 16 and extends through mounting plate 14. More specifically, vane base 24 is positioned in heated chassis 16. A first end of vane 26 is connected to vane base 24. Vane 26 extends through mounting plate 14. Annular gap 28 is adjacent vane base 24. Annular gap 28 is a space that surrounds vane base 24. Heated chassis 16 surrounds annular gap 28. As such, annular gap 28 is between vane base 24 and heated chassis 16. Consequently, annular gap 28 acts as a representation of the boundary between parts, such as vane 26 and vane base 24, that rotate and parts, such as mounting plate 14 and heated chassis 16, that do not rotate. Vane base 24 receives shaft connectors 30. Shaft connectors 30 extend through vane base 24.

Mounting plate 14 has circular opening 32 at its center. Vane assembly 22 extends through mounting plate 14 at opening 32. More specifically, vane 26 extends through opening 32. Mounting holes 34 are located around a periphery of mounting plate 14 radially outward from fasteners 20. Mounting holes 34 extend through mounting plate 14 from an exterior first surface of mounting plate 14 to an interior second surface of mounting plate 14. In this embodiment, mounting plate 14 has eight mounting holes 34. In alternate embodiments, mounting plate 14 may have any number of mounting holes 34.

Heated chassis 16 includes ring portion 36. Ring portion 36 is an annular portion of heated chassis 16 that extends into opening 32 of mounting plate 14 such that opening 32 extends around ring portion 36. An exterior surface of ring portion 36 of heated chassis 16 is about flush with the exterior surface of mounting plate 14. Ring portion 36 is also adjacent annular gap 28 such that ring portion 36 surrounds annular gap 28.

Angle of attack sensors 10 are installed on the sides of an aircraft and mounted to the aircraft via fasteners, such as screws or bolts, and mounting holes 34 on mounting plate 14. As a result, mounting plate 14 is about flush with the skin of the aircraft and housing 18 extends within an interior of the aircraft. Fasteners 20 fasten or join mounting plate 14 to heated chassis 16. Vane 26 extends outside an exterior of aircraft and is exposed to oncoming airflow, causing vane 26 and vane base 24 of vane assembly 22 to rotate with respect to mounting plate 14 and heated chassis 16 via a series of bearings within angle of attack sensor 10. Vane 26 rotates based on the angle the aircraft is flying at relative to the oncoming airflow. Shaft connectors 30 connect vane base 24 to a rotatable vane shaft within housing 18. Rotation of the rotatable shaft is sensed and used to measure the angle of attack or angle of ascent or descent of the aircraft.

Figure 2A:
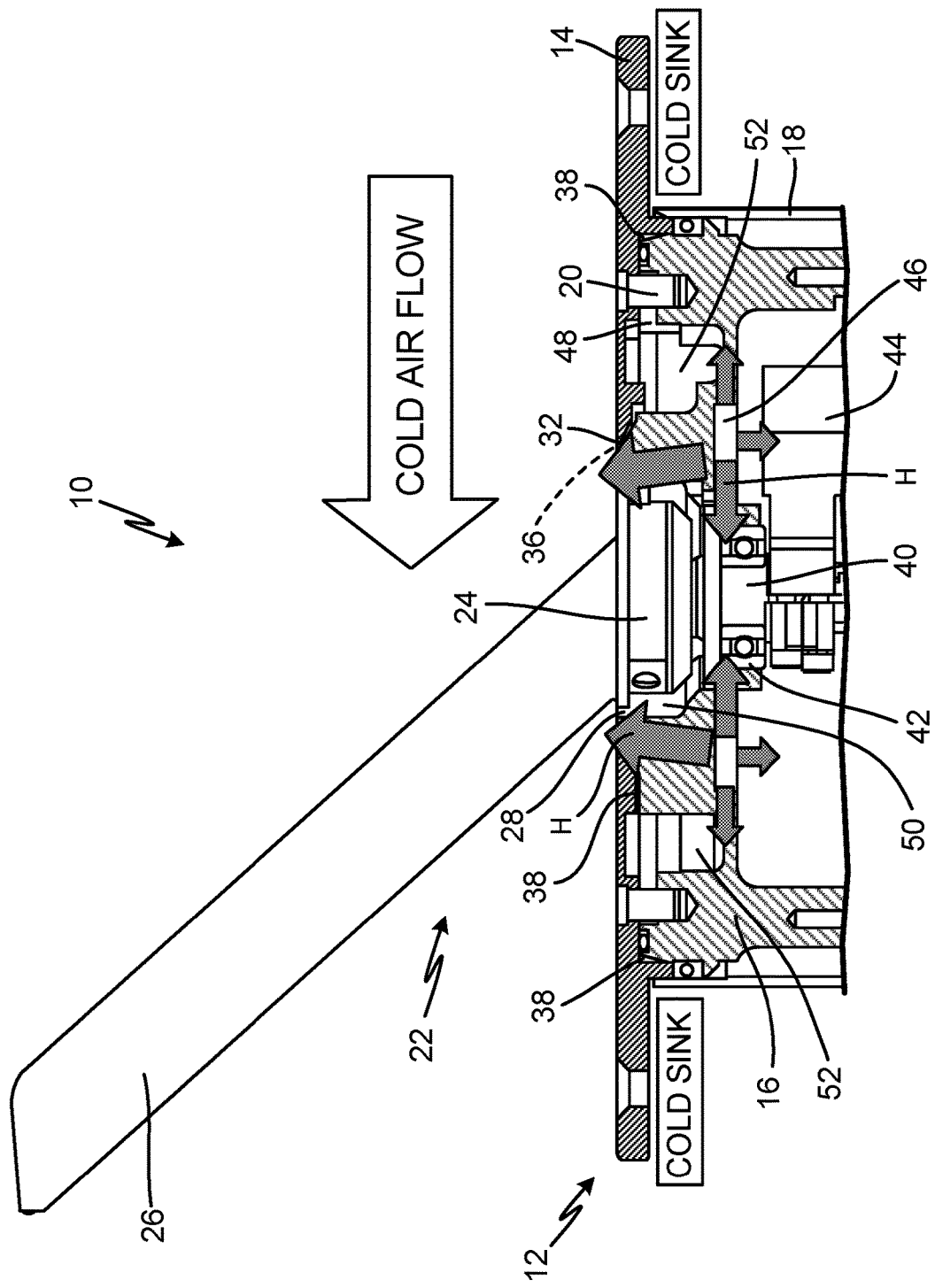
FIG. 2A is a partial cross-sectional side view of the angle of attack sensor.

FIG. 2A is a partial cross-sectional side view of angle of attack sensor 10. FIG. 2B is an enlarged partial cross-sectional side view of angle of attack sensor 10. Vane assembly 22 is not shown in cross-section in FIGS. 2A and 2B. A lower portion of angle of attack sensor 10 has been omitted from FIGS. 2A and 2B for simplicity. Details of components within a lower portion of housing 18 can be found in U.S. application Ser. Nos. 15/720,701 and 15/679,824, which have been incorporated by reference. FIGS. 2A and 2B will be discussed together. Angle of attack sensor 10 includes faceplate 12 (which includes mounting plate 14, heated chassis 16, and air gap 38), housing 18, fasteners 20, vane assembly 22 (which includes vane base 24 and vane 26), annular gap 28, vane shaft 40, bearing 42, counterweight 44, heater 46, and standoffs 48. Mounting plate 14 includes opening 32. Heated chassis 16 includes ring portion 36, pocket 50, and annular space 52.

Faceplate 12 includes mounting plate 14, or outer faceplate, adjacent heated chassis 16, or inner faceplate. Mounting plate 14 is positioned on heated chassis 16. Mounting plate 14 may be made of aluminum, other metals, or any other suitable thermally conductive material. Conversely, mounting plate 14 may be made of titanium, stainless steel, polymers, composite materials, other metals, or any other suitable material having low thermal conductivity. Heated chassis 16 is made of thermally conductive material. In this embodiment, heated chassis 16 is made of aluminum. In alternate embodiments, heated chassis 16 may include copper, other metals, metal alloys, or any other suitable thermally conductive material. Air gap 38 is located between mounting plate 14 and heated chassis 16. Air gap 38 is a space between mounting plate 14 and heated chassis 16 that fills with air. Air gap 38 can also be filled with an insulating material. The thickness of air gap 38 is maximized to minimize heat conduction from heated chassis 16 to mounting plate 14. The thickness of air gap 38 is generally larger than 0.03 inch. Heated chassis 16 is located interior to mounting plate 14 with respect to housing 18. Faceplate 12 is positioned on housing 18 adjacent the open first end of housing 18 such that heated chassis 16 is positioned within the open first end of housing 18 and mounting plate 14 is positioned exterior to heated chassis and adjacent the open first end of housing 18. Fasteners 20 are connected to mounting plate 14 and heated chassis 16. In this embodiment, fasteners 20 extend through mounting plate 14 into heated chassis 16.

Vane assembly 22, which includes vane base 24 and vane 26, has a portion that is positioned in heated chassis 16 and extends through mounting plate 14. Annular gap 28 is adjacent vane base 24 such that annular gap 28 is between vane base 24 and heated chassis 16. A first end of vane shaft 40 is connected to vane base 24 via shaft connectors 30 (shown in FIG. 1). More specifically, shaft connectors 30 extend through vane base 24 to connect vane base 24 to vane shaft 40. A second end of vane shaft 40 extends into housing 18. Bearing 42 is positioned around vane shaft 40 between the first end of vane shaft 40 and the second end of vane shaft 40. Counterweight 44 is mounted on the second end of vane shaft 40. As such, vane base 24, vane shaft 40, and counterweight 44 are configured to rotate together. Heater 46 is positioned on heated chassis 16. Heater 46 is annular, extending all the way around an end of heated chassis 16 that is adjacent housing 28. As such, heater 46 encircles bearing 42. Heater 46 is positioned on heated chassis 16 closer to bearing 42 than to housing 18. Heater 46 may be a self-regulating heater, a thermostatically controlled heater, or any other suitable heater.

Standoffs 48 are positioned between heated chassis 16 and mounting plate 14. Standoffs 48 may be positioned around fasteners 20 such that fasteners 20 go through centers of standoffs 48, and each standoff 48 extends around a fastener 20. Standoffs 48 are made of material having a thermal conductivity lower than heated chassis 16, such as stainless steel, plastic, titanium, polymers, composites, or any other suitable material. Standoffs 48 are shaped to maximize their conductive thermal resistance. The conductive thermal resistance of standoff 48 is measured by dividing the length of standoff 48 by the product of the thermal conductivity of the material of which standoff 48 is made and the cross-sectional area of standoff 48. As such, standoffs 48 have a wall thickness with a cross-sectional area as small as possible to maximize thermal resistance while still being within practical structural constraints. Standoffs 48 are also as long as possible to maximize thermal resistance while still being within practical structural constraints. Further, standoffs 48 are made of material having as low a thermal conductivity as possible while still being within practical structural constraints. Standoffs 48 may be cylindrical spacers, brackets, thick washers, multi-piece thermal breaks, or any other suitable thermal break. In an embodiment where mounting plate 14 is made of thermally conductive material, standoffs 48 are included. In an embodiment where mounting plate 14 is made of material having low thermal conductivity, such as composite material, standoffs 48 may not be included.

Mounting plate 14 has opening 32 at a center of mounting plate 14. Vane 26 of vane assembly 22 extends through opening 32. Ring portion 36 of heated chassis 16 also extends into opening 32 and is adjacent mounting plate 14 and annular gap 28. Heated chassis 16 defines pocket 50, within which a portion of vane assembly 22 is positioned. Specifically, vane base 24 of vane assembly 22 is positioned within pocket 50 of heated chassis 16. Pocket 50 is at a central portion of heated chassis 16. Heated chassis 16 has annular space 52 in a portion of heated chassis 16 between pocket 50 and an outer circumference of heated chassis 16. Annular space 52 is a space in heated chassis 16 that extends around heated chassis 16 and into heated chassis 16 from an exterior surface of heated chassis 16. As such, annular space 52 forms an internal chamber between heated chassis 16 and mounting plate 14 when mounting plate 14 is joined to heated chassis 16.

Oncoming airflow causes vane assembly 22, including vane 26 and vane base 24, to rotate with respect to faceplate 12. Rotation of vane base 24 causes rotation of vane shaft 40. Rotation of vane shaft 40 is sensed to generate angle of attack readings. Bearing 42 supports rotation of vane shaft 40. Counterweight 44 is mounted on vane shaft 40 to counterbalance vane 26.

Heater 46 provides heat to heated chassis 16. Heated chassis 16 is made of thermally conductive material, such as aluminum, so that heated chassis 16 can conduct heat to the rotating components of angle of attack sensor 10, such as vane assembly 22, vane shaft 40, and bearing 42. Ring portion 36 allows heated chassis 16 to extend up to the exposed outer surface of mounting plate 14 in an area surrounding vane assembly 22 to provide heat to the area surrounding vane assembly 22. At the same time, ring portion 36 only extends up to mounting plate 14 in the vicinity of vane assembly 22, limiting the surface area of heated chassis 16 that is directly exposed to the cold airflow, resulting in less convective heat loss from heated chassis 16. Additionally, as seen in FIG. 2A, the heat loss is centralized such that a majority of heat flow H is directed toward rotating components, including vane assembly 22, vane shaft 40, and bearing 42.

Mounting plate 14 is often made of thermally conductive material, such as aluminum, due to cost and weight restraints. Because mounting plate 14 is exposed to the cold oncoming airflow, mounting plate 14 draws heat from heated chassis 16. Air gap 38 acts as a thermal barrier in angle of attack sensor 10. First, air gap 38 decreases contact or creates physical separation between the interior surface of mounting plate 14 and the exterior surface of heated chassis 16. The physical separation limits conduction between mounting plate 14 and heated chassis 16. Second, because air is a poor conductor, air gap 38 creates insulation between mounting plate 14 and heated chassis 16. As a result, less convection occurs between mounting plate 14 and heated chassis 16. As such, air gap 38 reduces heat transfer from heated chassis 16 to mounting plate 14.

Standoffs 48 act as thermal breaks between heated chassis 16 and mounting plate 14 by creating thermal separation between mounting plate 14 and heated chassis 16. Maximizing conductive thermal resistance of standoff 48 minimizes heat flow between mounting plate 14 and heated chassis 16. As such, standoffs 48 choke the thermal path between mounting plate 14 and heated chassis 16. As seen in FIG. 2A, only a small portion of heat flow H is lost to the aircraft mounting surface via conduction.

Annular space 52 also decreases the contact or creates physical separation between the interior surface of mounting plate 14 and the exterior surface of heated chassis 16. Therefore, less conduction occurs between mounting plate 14 and heated chassis 16, reducing heat transfer from heated chassis 16 to mounting plate 14.

Traditionally, an angle of attack sensor has had a single-piece faceplate adjacent the vane assembly, which is exposed to the cold oncoming airflow. To avoid ice accretion on the vane assembly, which can cause the vane assembly to freeze, when the aircraft is flying in cold and moist conditions, the angle of attack sensor often includes a heater to heat the faceplate. However, a majority of heat generated by heaters on the faceplate is lost (1) via convection through the entirety of the exposed surface of the faceplate to the cold airflow and (2) via conduction to the cold aircraft mounting surface. As a result, less heat goes to the rotating components, such as the vane assembly, bearing, and vane shaft, where the heat is needed. As such, more power may be required to run the heaters in order to generate enough heat for the rotating components. If moisture from the cold airflow reaches the rotating components of the angle of attack sensor, ice accretion may occur, and the vane assembly may freeze. Consequently, traditional angle of attack sensors can consume large amounts of power but are still prone to ice accretion that impedes the free rotation of the vane, causing the angle of attack sensor to generate faulty readings or less accurate angle of attack measurements.

Angle of attack sensor 10 has a multi-piece faceplate comprising an outer faceplate, or mounting plate 14, which is thermally isolated from an inner faceplate, or heated chassis 16. Ring portion 36, air gap 38, standoffs 48, and annular space 52 allow for thermal management of angle of attack sensor 10 by restricting the flow of heat to the external surfaces of angle of attack sensor 10. Conductive heat flow H from heated chassis 16 to mounting plate 14 and convective heat flow H from mounting plate 14 to the cold airflow is redirected. As a result, less heat is lost in undesired areas and localized heat loss occurs in areas requiring heat flow H. Therefore, even though a majority of heat is still lost via conduction and convection to outer cold airflow, heat is lost in the vicinity of rotating components so that more heat is delivered to rotating components rather than (1) toward the outer periphery of mounting plate 14 where mounting plate 14 contacts the aircraft or (2) along the entire surface of mounting plate 14. Thus, multi-piece faceplate 12 increases heating efficiency of angle of attack sensor 10 by minimizing or controlling heat loss so that heat flow H goes where heat is needed in angle of attack sensor 10. As a result, the temperatures between rotating components are well above the freezing point of water in all flight conditions, while the amount of power required for maintaining rotating components above freezing is significantly reduced. Consequently, ice accretion is reduced, and vane assembly 22 is less likely to freeze and induce inaccurate sensor readings.

Additionally, the faceplate of an angle of attack sensor is commonly damaged by blowing sand, volcanic ash, debris, and other environmental conditions as well as during aircraft installation and maintenance. Multi-piece faceplate 12 allows mounting plate 14 to quickly and easily be removed and replaced without complete disassembly of angle of attack sensor 10, saving time and money.

Figure 3A:
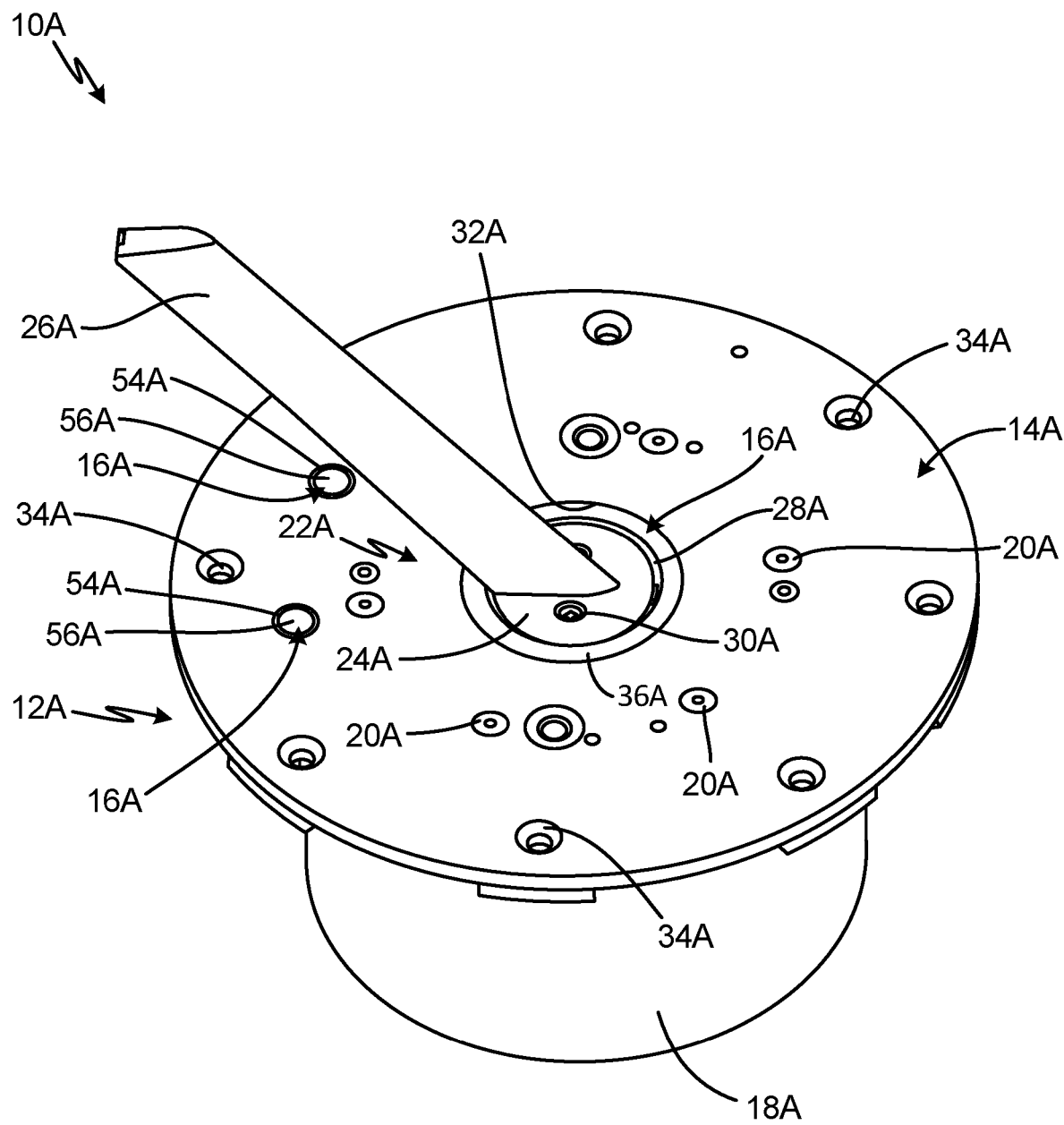
FIG. 3A is a perspective top view of a second embodiment of an angle of attack sensor.

FIG. 3A is a perspective top view of a second embodiment of angle of attack sensor 10A. Angle of attack sensor 10A includes mounting plate 14A having openings 54A and heated chassis 16A having protrusions 56A.

Angle of attack sensor 10A has a similar structure as described in reference to angle of attack sensor 10 in FIGS. 1, 2A, and 2B. Mounting plate 14A has openings 54A positioned between opening 32A and mounting holes 34A. Openings 54A extend through mounting plate 14A from an exterior first surface of mounting plate 14A to an interior second surface of mounting plate 14A. In this embodiment, openings 54A are circular. In alternate embodiments, openings 54A may be any suitable shape. Heated chassis 16A includes protrusions 56A. Protrusions 56A are portions of heated chassis 16A that extend into openings 54A in mounting plate 14A such that openings 54A extend around protrusions 56A. Exterior surfaces of protrusions 56A are about flush with the exterior surface of mounting plate 14A. In alternate embodiments, exterior surfaces of protrusions 56A may extend above the exterior surface of mounting plate 14A. In further alternate embodiments, exterior surfaces of protrusions 56A may be below the exterior surface of mounting plate 14A. In this embodiment, protrusions 56A are cylindrical. In alternate embodiments, protrusions 56A may have a fish-tail shape or any other suitable shape. Openings 54A and protrusions 56A may be positioned such that they are downstream of vane assembly 22A. Alternatively, openings 54A and protrusions 56A may be positioned in any suitable location on mounting plate 14A and heated chassis 16A, respectively. In this embodiment, angle of attack sensor 10A has two openings 54A and two protrusions 56A. In alternate embodiments, angle of attack sensor 10A may have more or less than two openings 54A and two protrusions 56A.

Protrusions 56A allow heated chassis 16A to extend up to the exposed outer surface of mounting plate 14A in an area near vane assembly 22A to provide heat to the area of mounting plate 14A near vane assembly 22A. At the same time, protrusions 56A limit the surface area of heated chassis 16A that is directly exposed to the cold airflow, resulting in less convective heat loss from heated chassis 16A.

Figure 3B:
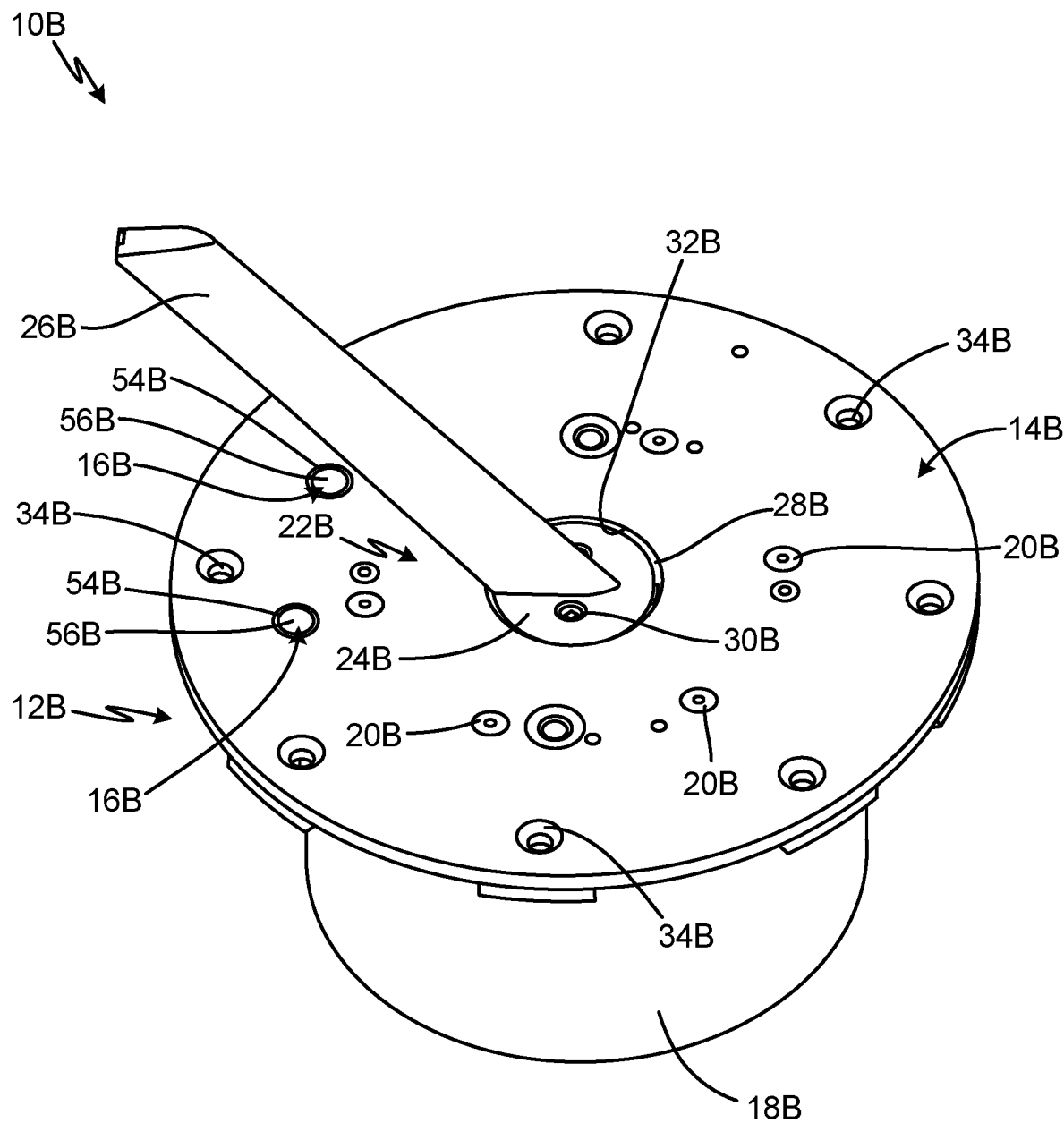
FIG. 3B is a perspective top view of a third embodiment of an angle of attack sensor.

FIG. 3B is a perspective top view of a third embodiment of angle of attack sensor 10B. Angle of attack sensor 10B includes mounting plate 14B having openings 54B and heated chassis 16B having protrusions 56B.

Angle of attack sensor 10B has a similar structure as described in reference to angle of attack sensor 10 in FIGS. 1, 2A, and 2B and angle of attack sensor 10A in FIG. 3A but not including ring portion 36 or 36A. Thus, protrusions 56B are the only portions of heated chassis 16B that through mounting plate 14B to the exposed outer surface of mounting plate 14B. As such, protrusions 56B provide heat to an area of mounting plate 14B near vane assembly 22B while minimizing the surface area of heated chassis 16B that is directly exposed to the cold airflow, resulting in less convective heat loss from heated chassis 16B.

Discussion of Possible Embodiments

The following are non-exclusive descriptions of possible embodiments of the present invention.

An angle of attack sensor includes a vane assembly; and a multi-piece faceplate adjacent the vane assembly, the faceplate including: a heated chassis defining a pocket; and a mounting plate positioned adjacent the heated chassis and having an opening; wherein the vane assembly has a portion that is positioned in the pocket of the heated chassis and extends through the opening of the mounting plate.

The angle of attack sensor of the preceding paragraph can optionally include, additionally and/or alternatively, any one or more of the following features, configurations and/or additional components:

The mounting plate is made of a material selected from the group consisting of: polymers, composites, and metals.

An air gap between the heated chassis and the mounting plate.

A fastener connected to the heated chassis and the mounting plate.

A standoff positioned between the heated chassis and the mounting plate, wherein the standoff is configured to be a thermal break between the heated chassis and the mounting plate.

The standoff is comprised of a material selected from the group consisting of: stainless steel, plastic, polymers, and composites.

The heated chassis is made of thermally conductive metal or metal alloys.

A heater positioned on the heated chassis.

The heated chassis includes a ring portion that extends into the opening of the mounting plate.

The heated chassis includes a protrusion that extends into an opening in the mounting plate.

The heated chassis includes an annular space extending into the heated chassis from an exterior surface of the heated chassis.

The heated chassis defines a pocket at a central portion of the heated chassis and wherein a vane base of the vane assembly is positioned within the pocket.

The mounting plate is made of aluminum.

A faceplate for an angle of attack sensor includes a heated chassis defining a pocket at a central portion of the heated chassis, the pocket being configured to receive a portion of a vane assembly; a mounting plate positioned adjacent the heated chassis and having an opening; and an air gap located between the mounting plate and the heated chassis.

The faceplate of the preceding paragraph can optionally include, additionally and/or alternatively, any one or more of the following features, configurations and/or additional components:

The mounting plate is thermally isolated from the heated chassis.

The heated chassis includes a ring portion that extends into the opening of the mounting plate.

The heated chassis is made of thermally conductive metal or metal alloys.

The heated chassis includes an annular space extending into the heated chassis from an exterior surface of the heated chassis.

The heated chassis includes a protrusion that extends into an opening in the mounting plate.

The mounting plate is made of a material selected from the group consisting of: polymers, composites, and metals.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack sensor comprising:
a vane assembly; and
a multi-piece faceplate adjacent the vane assembly, the faceplate including:
a heated chassis defining a pocket; and
a mounting plate positioned on the heated chassis and having a first opening;

wherein the vane assembly has a vane base that is positioned in the pocket of the heated chassis and connected to a vane shaft, and the heated chassis includes a protrusion that extends into a second opening in the mounting plate, the second opening extending from an interior surface of the mounting plate to an exterior surface of the mounting plate and the protrusion extending into the second opening toward the exterior surface of the mounting plate.

2. The angle of attack sensor of claim 1, wherein the heated chassis is made of thermally conductive metal or metal alloys, and the mounting plate is made of a material selected from the group consisting of: polymers, composites, and metals.

3. The angle of attack sensor of claim 1, further including a heater positioned on the heated chassis.

4. The angle of attack sensor of claim 3, further including a fastener connected to the heated chassis and the mounting plate.

5. The angle of attack sensor of claim 4, wherein the heated chassis defines the pocket at a central portion of the heated chassis.

6. The angle of attack sensor of claim 5, further including an air gap between the heated chassis and the mounting plate.

7. The angle of attack sensor of claim 1, further including a standoff positioned between the heated chassis and the mounting plate, wherein the standoff is configured to be a thermal break between the heated chassis and the mounting plate.

8. The angle of attack sensor of claim 7, wherein the standoff is comprised of a material selected from the group consisting of: stainless steel, plastic, polymers, and composites.

9. The angle of attack sensor of claim 8, further including an air gap between the heated chassis and the mounting plate.

10. The angle of attack sensor of claim 9, wherein the heated chassis includes an annular space extending into the heated chassis from an exterior surface of the heated chassis.

11. The angle of attack sensor of claim 1, wherein the protrusion and the second opening are positioned downstream of the vane assembly.

12. The angle of attack sensor of claim 1, wherein the heated chassis includes a second protrusion that extends into a third opening in the mounting plate.

13. A faceplate for an angle of attack sensor comprising:
    a heated chassis defining a pocket at a central portion of the heated chassis, the pocket being configured to receive a vane base of a vane assembly connected to a vane shaft; and
    a mounting plate positioned on the heated chassis and having a first opening and a second opening, the first opening and the second opening each extending from an interior surface of the mounting plate to an exterior surface of the mounting plate;
    wherein the heated chassis includes a protrusion that extends into the second opening in the mounting plate toward the exterior surface of the mounting plate.

14. The faceplate of claim 13, wherein the heated chassis is made of thermally conductive metal or metal alloys, and the mounting plate is thermally isolated from the heated chassis.

15. The faceplate of claim 14, wherein the heated chassis includes a ring portion that extends into the first opening of the mounting plate.

16. The faceplate of claim 13, wherein the heated chassis includes an annular space extending into the heated chassis from an exterior surface of the heated chassis.

17. The faceplate of claim 16, further including a standoff positioned between the heated chassis and the mounting plate, wherein the standoff is configured to be a thermal break between the heated chassis and the mounting plate.

18. The faceplate of claim 17, further including an air gap located between the mounting plate and the heated chassis.

19. The faceplate of claim 18, wherein the heated chassis includes a second protrusion that extends into a third opening in the mounting plate.

20. The faceplate of claim 19, further including a heater positioned on the heated chassis and a fastener connected to the heated chassis and the mounting plate.

* * * * *